United States Patent [19]

Lambrecht

[11] Patent Number: 5,330,210
[45] Date of Patent: Jul. 19, 1994

[54] CART HAVING A CHILD ACCOMMODATING SEAT STRUCTURE

[76] Inventor: Gene K. Lambrecht, 675 Ten Rod Rd., North Kingstown, R.I. 02852

[21] Appl. No.: 997,857

[22] Filed: Dec. 29, 1992

[51] Int. Cl.⁵ .............................................. B62B 5/00
[52] U.S. Cl. .............................. 280/33.993; 297/181; D21/78
[58] Field of Search ................. 280/1.13, 1.23, 33.991, 280/33.992, 33.993, 33.995, 33.996, 33.997, 47.38, 47.4, 1.16, 1.189, 2.02, 2.2; 297/181; D21/76, 78, 136, 137, 250

[56] References Cited

U.S. PATENT DOCUMENTS

| | | | |
|---|---|---|---|
| D. 256,150 | 7/1980 | Lofton et al. | D21/76 X |
| D. 311,760 | 10/1990 | Harrod | D21/78 |
| D. 330,736 | 11/1992 | Silber | D21/78 |
| 2,443,236 | 6/1948 | Gallagher | 280/33.993 X |
| 2,615,726 | 10/1952 | Brottman | 280/33.993 X |
| 3,245,498 | 4/1966 | Stanley et al. | 280/33.995 |
| 3,297,108 | 1/1967 | Davis | 280/33.995 |
| 4,097,056 | 6/1978 | Castellano | 280/33.991 X |
| 4,116,456 | 9/1978 | Stover et al. | 280/33.993 |
| 4,423,882 | 1/1984 | Stover et al. | 280/33.993 |
| 4,805,935 | 2/1989 | Grayson | 280/33.992 |

OTHER PUBLICATIONS

Progressive Grocer, p. 8, Aug. 1992.
Sears Catalog p. 3, 255-257, ®1991 Sears.
United Visamatic 851 Product Specification, date unknown.

Primary Examiner—Brian L. Johnson
Attorney, Agent, or Firm—Robert S. Smith

[57] ABSTRACT

An improved wheeled cart includes a frame having upper and lower frame portions. Upper and lower baskets are connected, respectively, to the upper and lower frame portions. A removable shell is disposed on a part of the lower frame portion and on a part of the lower basket. The shell includes a seat for locating a seated child directly below the upper basket. Preferably, the shell has a shape which typically is pleasing to the child. The shape is, for example, of a motor vehicle, train, aircraft, spacecraft or the like.

17 Claims, 3 Drawing Sheets

CART HAVING A CHILD ACCOMMODATING SEAT STRUCTURE

BACKGROUND OF THE INVENTION

1. Field of the Invention

The present invention relates to carts for carrying groceries and the like, and more particularly relates to such carts adapted to accommodate a child.

2. Description of the Prior Art

Carts (e.g., shopping carts) for carrying groceries, packages and the like which are adapted to accommodate a child (e.g., a baby) are known. See, for example, U.S. Pat. Nos.: 2,443,236; 3,245,498; 3,297,108 and 4,116,456. One commercially available shopping cart is a model 851 VISAMATIC cart sold by United Steel and Wire Company, Battle Creek, Mich. Generally, such known carts include a child or baby basket located at a front or a rear portion of the cart.

The present inventor believes that further improvements in such carts are achievable.

It is a principal object of the present invention to provide a cart with a child carriage located such that the cart is well balanced when a child occupies the carriage.

It is an additional object of the present invention to accommodate a child on any conventional shopping cart in a safe and simple manner.

It is a further object of the present invention to accommodate a child on any conventional shopping cart such that the likelihood of the child enjoying his/her ride on the cart is increased.

It is another object of the present invention to increase overhead protection for a child riding on a shopping cart.

According to one preferred embodiment of the present invention, an improved cart includes a frame on which are connected upper and lower baskets, and further includes a shell disposed onto the lower basket. The shell has a seat arranged and dimensioned to locate a child directly below the upper basket. Preferably, the shell is formed of a one-piece construction and includes slots and notches arranged and dimensioned to engage with the frame and the lower basket such that the shell is easily and reliably mountable on and dismountable (i.e., removable) from the frame and the lower basket. Desirably, the shell is formed of a sturdy and lightweight material and has a shape which typically is pleasing to children. For example, the shell has the shape of a motor vehicle, train, aircraft, spacecraft, watercraft, wagon or the like. The shell is formed of, for example, fiberglass, a plastic, a composite or even a lightweight metal such as aluminum and manufactured, for example, by well-known techniques such as spraying onto a mold, vacuum or injection molding or even casting.

Further and still other objects of the present invention will become more readily apparent in view of the following detailed description when taken in conjunction with the accompanying drawing, in which:

DETAILED DESCRIPTION OF PREFERRED EMBODIMENTS AND BEST MODE

Figure 1:
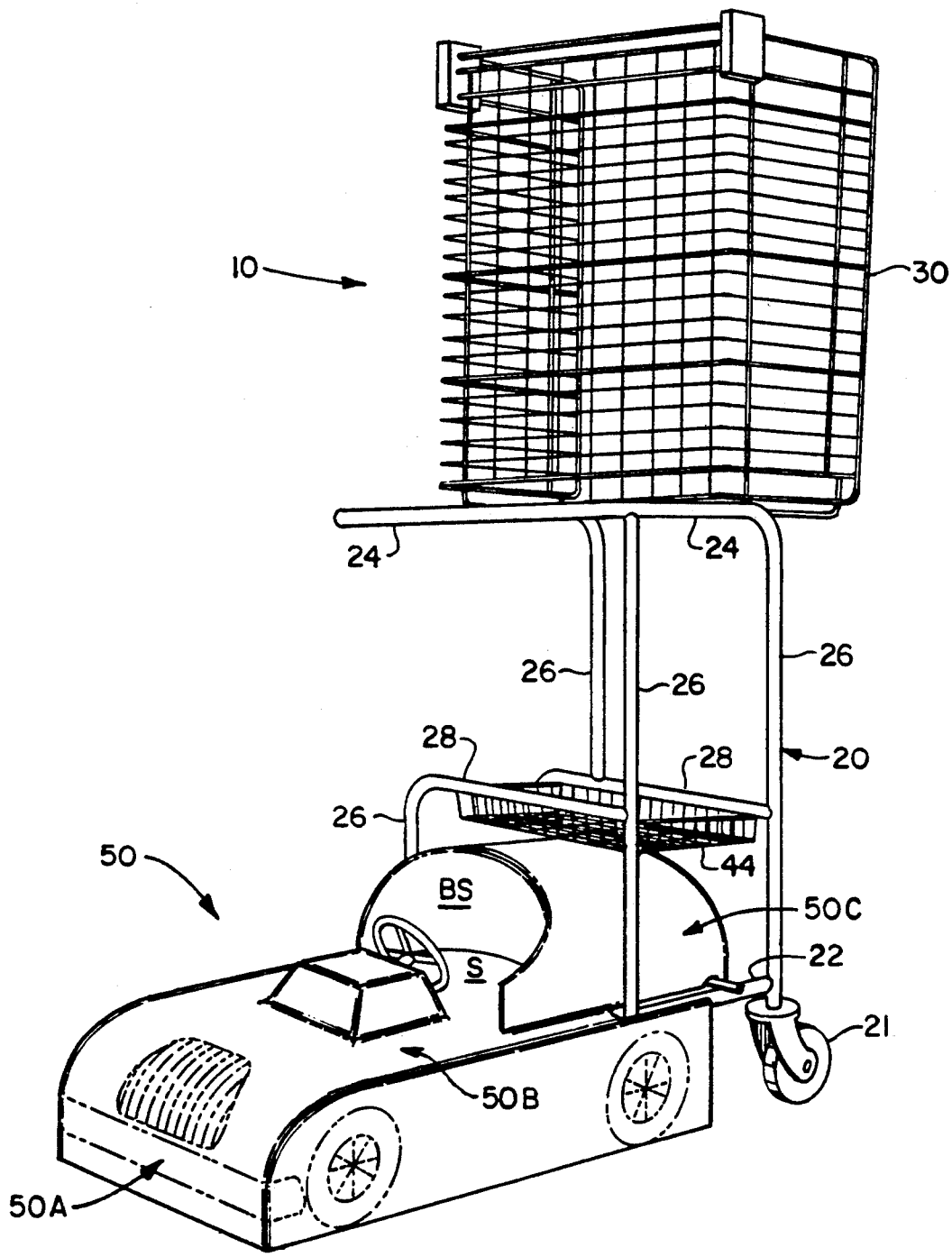
FIG. 1 is a front and side perspective view of a preferred embodiment of the present invention.
Figure 6:
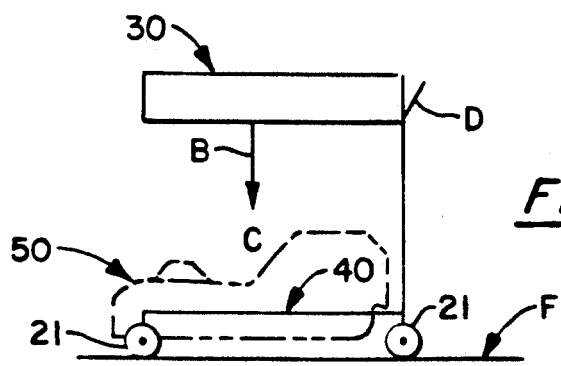
FIG. 6 is a side schematic view showing a child C located on a seat of the shell (in phantom) directly below the upper basket; the shell is spaced from a floor F.

Referring now to the figures and FIG. 1 in particular, there is shown a preferred cart according to the present invention. The preferred cart includes a cart 10 (such as a conventional shopping cart) on which a child carriage or shell 50 is mounted such that the shell 50 moves together with the cart 10 when the cart 10 is moved, e.g. pushed, along a floor F by means of a shopper (not shown) pushing a handle D (FIG. 6).

Figure 3:
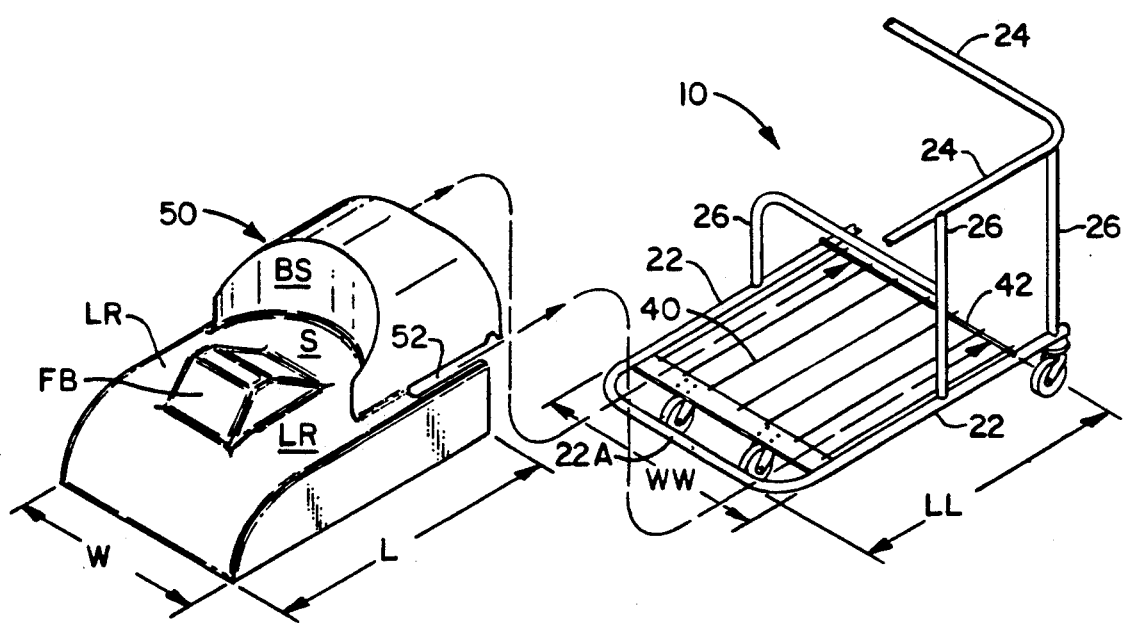
FIG. 3 is a front and side perspective view of the shell separated from a conventional shopping cart which is partly cut away for clarity.

The cart 10 includes tubular metal (e.g., steel) frame 20 having a lower frame portion 22 connected (e.g., welded) to an upper frame portion 24 by means of vertical support members 26. A pivotal basket 30 is suitably attached to the portion 24. The basket 30 is dimensioned to accommodate, for example, groceries and the like. A plurality (e.g., four) of wheels 21 or casters is pivotally attached to the frame 20. The cart 10 includes an intermediate basket 44 connected to the frame by means of cross support members 28. A lower basket 40 (FIG. 3) is fixed to the lower frame portion 22 in any suitable (e.g., welded) fashion. Conventional carts employable by the invention include, for example, the carts shown and described in U.S. Pat. Nos.: 4,116,456, 3,297,108 and 3,245,498 which are all hereby incorporated by reference. However, the baby baskets/seats shown in these patents are unnecessary for the present invention.

Figure 4:
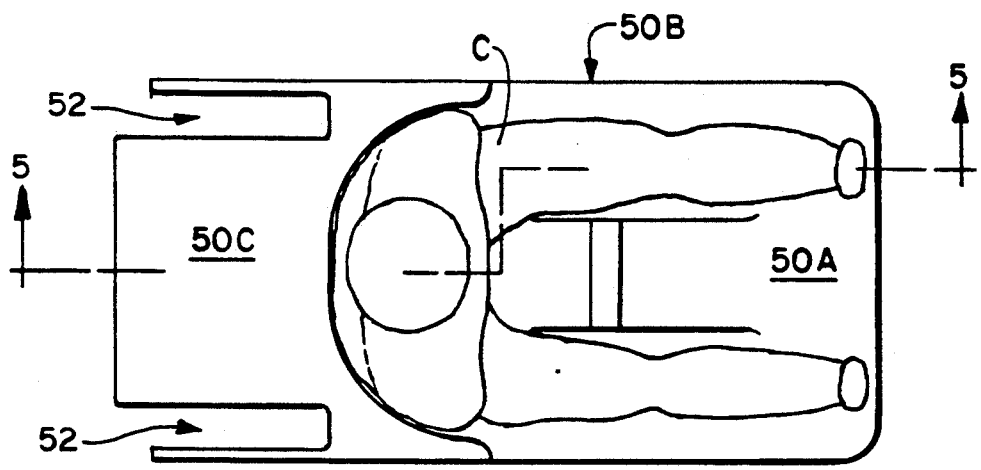
FIG. 4 is a top plan view of a child located on the shell.
Figure 5:
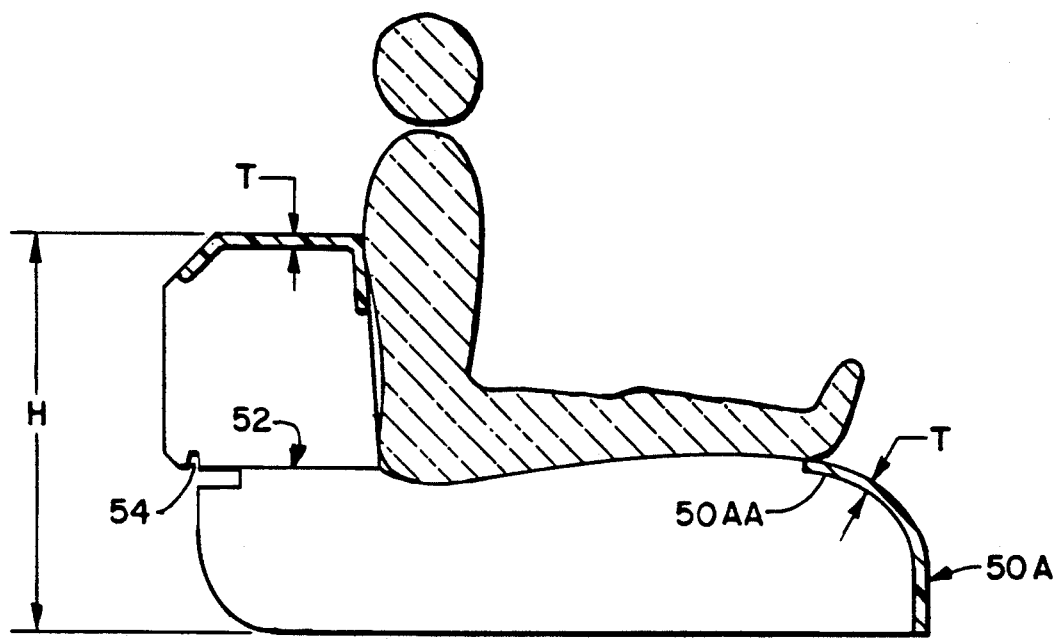
FIG. 5 is a side schematic view taken through a line 5—5 of FIG. 4.

The preferred cart of the present invention further includes a child carriage or shell 50 suitably disposed on a part of the lower frame portion 22 and a part of the lower basket 40. In FIG. 1, the shell 50 envelopes a majority of the portion 22 and the basket 40. The shell 50 includes a front portion 50A fixed to a rear portion 50C by means of an intermediate portion 50B. The portion 50B includes an integral seat S and a back support BS to accommodate a child of approximately one to approximately six years of age. The shell includes also a front brace FB and leg resting areas LR so that a child seated in the seat S rests his/her legs along the areas LR; the legs flank the front brace (e.g., a mound). See FIGS. 3, 4 and 5. The shell is formed of any suitably sturdy and light-weight material such as a fiberglass, a plastic, a composite or even a light-weight metal such as aluminum or the like. The shell 50 has a substantially uniform (substantially constant) thickness T. See FIG. 5 which shows the shell 50 partly in cross section. Of course, the thickness T can vary dependent upon the particular material and manufacturing method used for the shell 50. The shell has an external width W and an external length L. The width W is somewhat (e.g., 30%) greater than an external width WW of the lower frame portion 22. The external length L is slightly (e.g., 1-10%) less than an external length LL of the cart 10 measured from an outermost surface of the lower frame portion 22 to a transverse member 42B of a sloping rear wall 42. See FIG. 2 and FIG. 3. The shell is manufactured by means of well-known techniques such as spraying or otherwise applying fiberglass on a suitable mold, or vacuum forming, injection molding or even casting.

Figure 2:
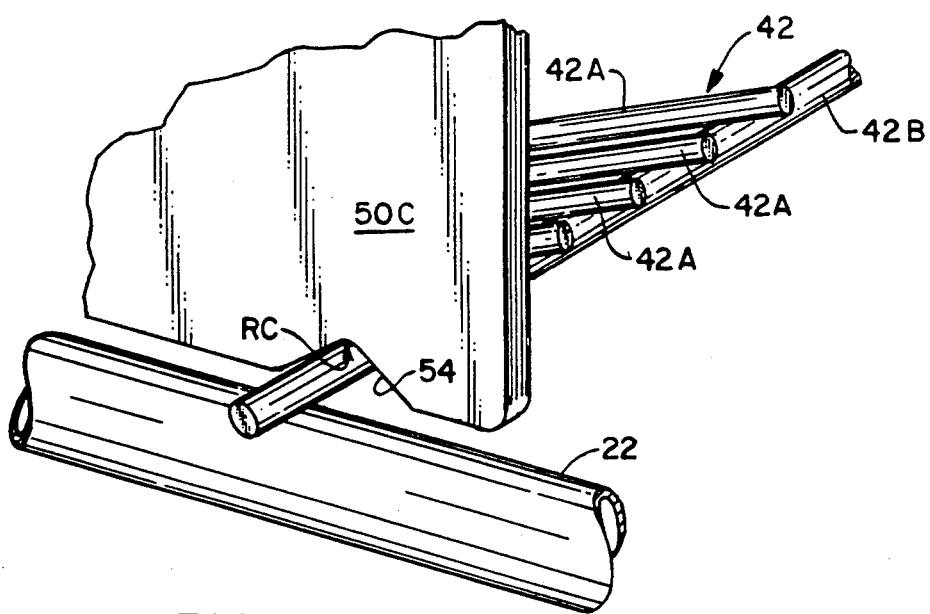
FIG. 2 is a perspective view, partly cut away, showing a detail of a notch formed in the shell, in which notch is located a sloping rear wall of a lower basket of a conventional shopping cart.

In order to effect a reliable and easy mounting of the shell 50 on the cart 10, the shell includes a pair of slots 52 and a pair of notches 54. The slots 52 are arranged and dimension to receive an appropriate pair of vertical support members 26 extending upwardly from the lower frame portion 22 (see FIG. 1 and FIG. 3). Each slot 52 has a width, for example, which is slightly (e.g., 10%) greater than the outer diameter of the member 26 received within the slot 52. Each slot 52 has a length, for example, which permits the notches 54 to receive a transverse member 42B of the lower basket 40. The notches 54 are located in the rear portion 50C and are arranged and dimensioned to receive the transverse member 42B of the sloping rear wall 42 of the lower basket 40. In the embodiment shown, the notches 54 open in a generally downwardly direction. Each notch 54 has a radius of curvature (RC), for example, which is slightly greater than the outer radius of the member 42B. The wall 42 is sloped or inclined upwardly and rearwardly as shown in FIG. 2. Inclined members 42A form the remainder of the wall 42 and are fixed (e.g., welded) to the member (e.g., bar) 42B.

As shown in FIG. 6, the shell locates a child C directly below the upper basket 30—i.e., below an arrow B. In normal operation, a front surface 22A of the portion 22 is engaged with an interior surface 50AA of the portion 50A so that the shell 50 is suitably spaced (e.g., two inches) from the floor F. Of course, other surfaces of the portion 22 may engage with other interior surfaces of the shell 50. Such a location provides overhead protection for the child C and improved stability for the cart 10 having the shell 50 mounted thereon when a child C is seated in the seat S. A seat belt (not shown) restrains the child in the seat S. A height H (and particularly the height of the seat S) is such that a child's head does not contact the underside of the basket 30 in normal operation of the cart.

Desirably, the shell is configured in the form of a motor vehicle (e.g., automobile, truck, bus or the like). One embodiment of the invention has the following approximate dimensions in inches when the shell is formed of fiberglass: W=20", H=16.5", L=34", T=⅛", WW=14", LL=34⅛", Each slot=10"×2⅛", RC=⅛".

As is well understood by those skilled in the art in view of the instant disclosure, the specific arrangements and dimensions of the slots 52, notches 54 and other features of the shell 50 depend upon the particular features and dimensions of the particular cart 10. For example, in some conventional shopping carts, an external width of the lower frame portion 22 at the rear of the cart 10 is greater than an external width WW at the front of the cart, so that the portion 22 is tapered in a direction from the rear to the front. If desired, those skilled in the art can readily modify the shell 50 to accommodate such a taper.

While there has been shown and described what is at present considered the preferred embodiment of the present invention, various changes may be made therein without departing from the spirit and scope of the invention as defined by the appended claims.

What is claimed is:

1. A cart, comprising:
    a frame having a lower frame portion, an upper frame portion and at least one support member extending upwardly from and interconnecting said lower frame portion and said upper frame portion;
    wheels supporting said frame;
    an upper basket attached to said upper frame portion;
    a lower basket connected to said lower frame portion, and
    a shell disposed on said lower basket, said shell including at least one slot, said support member being disposed within said slot, said shell further including a seat arranged and dimensioned to locate a child directly below said upper basket.

2. A cart as claimed in claim 1, wherein said shell has a shape of a wheeled vehicle.

3. A cart as claimed in claim 1, wherein said slot has a width which is slightly greater than an outer diameter of said support member.

4. A cart as claimed in claim 1, wherein said lower basket comprises a planar bottom surface connected to a sloping rear wall inclined upwardly and rearwardly from said planar bottom surface, and wherein said shell includes a rear portion, said rear portion having a notch engaged with said sloping rear wall.

5. A cart as claimed in claim 4, wherein said sloping rear wall includes a tubular member disposed across said sloping rear wall, and wherein said notch has a radius of curvature which is greater than an outer radius of said tubular member.

6. A cart as claimed in claim 1, wherein said slot is formed in a rear portion of said shell.

7. A cart as claimed in claim 1, wherein a vertical distance from said seat to a bottom of said upper basket is greater then a vertical distance from the buttocks to the top of the head of a child.

8. A shell for a cart, comprising:
    a front portion;
    a rear portion, and
    an intermediate portion connecting said front portion to said rear portion, said intermediate portion including an integral seat arranged and dimensioned to accommodate a child;
    said rear portion including a pair of slots arranged and dimensioned for receiving upwardly extending support members of the cart, said rear portion further including a pair of notches arranged and dimensioned for engagement with an upwardly sloping rear wall of the cart, the upwardly sloping rear wall being disposed intermediately of the support members.

9. A shell as claimed in claim 8, wherein said shell has a shape of a motor vehicle.

10. A shell as claimed in claim 8, wherein said shell comprises fiberglass.

11. A shell as claimed in claim 8, wherein said shell comprises a plastic.

12. A shell as claimed in claim 8, wherein said shell has a substantially uniform thickness.

13. A cart, comprising:
    a lower frame portion;
    wheels supporting said lower frame portion;
    an upper frame portion;
    at least one support member connecting said lower frame portion to said upper frame portion, and
    a shell disposed on said lower frame portion, said shell including at least one slot, said support member being disposed within said at least one slot, said shell further including an integral seat arranged and dimensioned to accommodate a child.

14. A cart as claimed in claim 13, wherein said shell has a shape of a motor vehicle.

15. A cart as claimed in claim 13, wherein said at least one support member extends vertically from said lower frame portion to said upper frame portion.

16. A cart as claimed in claim 13, wherein said shell further includes a leg resting area disposed on an outer surface of said shell, said leg resting area being arranged and dimensioned such that a child disposed on said seat can rest a leg on said leg resting area.

17. A cart as claimed in claim 16, wherein said shell further includes said leg resting area which flanks an integral mound area.

* * * * *